United States Patent
Scrogham et al.

[11] Patent Number: 5,992,643
[45] Date of Patent: Nov. 30, 1999

[54] IN LINE FLUID FILTER ASSEMBLY

[75] Inventors: Terry Lee Scrogham; Richard Becker, both of Coral Springs, Fla.

[73] Assignee: Labor Saving Products Inc., Pompono Beach, Fla.

[21] Appl. No.: 09/028,044

[22] Filed: Feb. 23, 1998

[51] Int. Cl.[6] .................................................. B01D 27/07
[52] U.S. Cl. ..................... 210/439; 210/435; 210/446; 210/459; 210/438
[58] Field of Search ........................... 210/321.6, 321.72, 210/321.74, 435, 459, 500.25, 321.76, 321.83, 321.85, 438, 439, 487

[56] References Cited

U.S. PATENT DOCUMENTS

| | | | |
|---|---|---|---|
| 2,883,058 | 4/1959 | Jaume | 210/487 |
| 3,827,562 | 8/1974 | Esmond | 210/304 |
| 4,178,250 | 12/1979 | Turetsky . | |
| 4,812,235 | 3/1989 | Seleman . | |
| 4,906,372 | 3/1990 | Hopkins | 210/321.74 |
| 5,078,877 | 1/1992 | Cudaback . | |
| 5,223,136 | 6/1993 | Gilbert . | |

*Primary Examiner*—W. L. Walker
*Assistant Examiner*—Terry K. Cecil
*Attorney, Agent, or Firm*—Alvin S. Blum

[57] ABSTRACT

An in line fluid filter has an elongate tubular housing with end fittings. An axially disposed closed elongate cylinder is held within the housing defining an annular fluid chamber therebetween. The annular fluid chamber is divided into a plurality of concentric, parallel annular flow paths by at least one elongate concentric, fluid impermeable partition. The flow paths are occupied by a woven wire filter fabric with coarse mesh. This provides a long tortuous filter path that does not readily clog up and that prevents the passage of large particles.

11 Claims, 2 Drawing Sheets

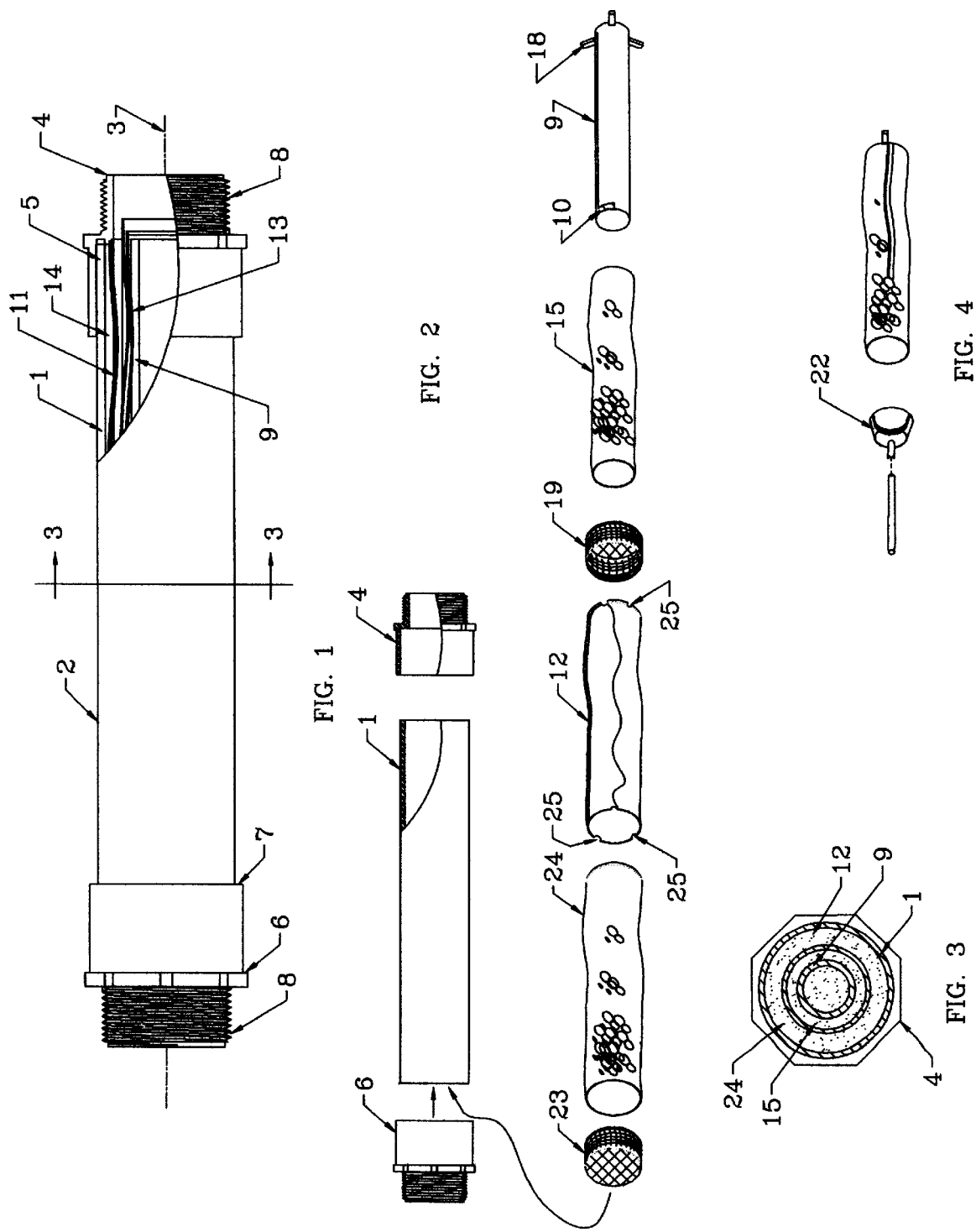

ered and enough area so that as pores are
IN LINE FLUID FILTER ASSEMBLY

BACKGROUND OF THE INVENTION

This invention relates to filtering apparatus, and more particularly to an elongate fluid filter assembly that is resistant to clogging.

When water is pumped from a stream or a well for drinking or irrigation, it is generally passed through a check valve before reaching the pump so as to hold a priming fluid between operations of the pump in the case of the common centrifugal pumps. A filter is generally connected before the check valve to trap solids that would otherwise render the check valve inoperative. Most in line filters clog up after a short period of use when in certain applications. This reduces flow and efficiency of operations, necessitating cleaning or replacing the filter. A need exists for a simple, inexpensive filter that does not clog up so easily.

Fluid filters for this purpose are generally of the type with a large surface area and limited depth to cause minimal pressure drop and have enough area so that as pores are clogged by solids the remaining surface will provide free fluid passage. However, the pores are so readily clogged that the useful area is too rapidly reduced in many applications.

SUMMARY OF THE INVENTION

It is accordingly an object of the invention to provide an elongate in line fluid filter assembly that does not readily clog and that is simple and inexpensive to manufacture and use. The filter assembly of the invention comprises an outer tubular housing with threaded adapters at each end for plumbing connection to a fluid inlet pipe and a fluid outlet pipe. Within the tubular housing are a plurality of inner fluid-impervious cylindrical elements substantially concentric with the tubular housing. Interposed between the cylindrical elements and the tubular housing are cylindrical layers of stainless steel mesh which entrap the solids and permit free passage of fluid. The assembly is so constructed that the fluid path is always substantially axial relative to the tubular housing, passing between the housing and an inner cylindrical element and through the mesh held therebetween or between two layers of inner cylindrical elements and through the mesh held therebetween. The depth of the filtering media is substantially equal to the length of the housing, which may be ten inches, for example. This compares to the depth of convention filter media which may be one sixteenth of an inch. The mesh is quite coarse so that there is much open space, but the path through the filter media itself is so tortuous that solids are eventually trapped at some point in their long path through the filter media.

These and other objects, advantages and features of the invention will become apparent when the detailed description is studied in conjunction with the drawings, in which like elements are designated by like reference characters in the various drawing figures.

BRIEF DESCRIPTION OF THE DRAWINGS

FIG. 1 is a top view, partially broken away, of the filter assembly of the invention.

FIG. 2 is an exploded perspective view of the assembly of FIG. 1.

FIG. 3 is a sectional view taken through line 3—3 of FIG. 1.

FIG. 4 is a perspective detail view, partially broken away, of an alternative embodiment of the invention.

DETAILED DESCRIPTION OF PREFERRED EMBODIMENTS

Figure 6:
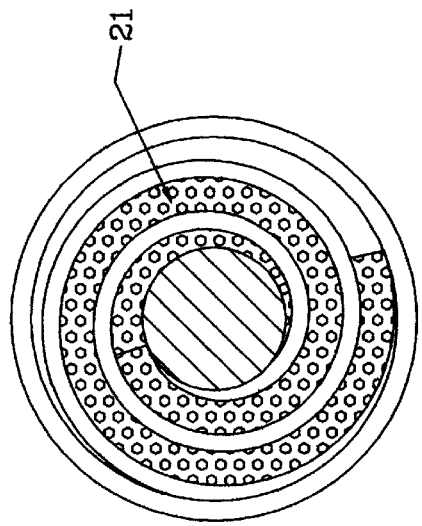
FIG. 6 is a transverse sectional view of the assembly shown in FIG. 5.

Referring now first to FIGS. 1–3, the in line fluid filter assembly 2 of the invention comprises an elongate hollow tubular housing 1 with a long axis 3, a first end 5 to which is sealed the open outlet port 4, and a second end 7 to which is sealed open inlet port 6. Housing and ports may be of PVC plastic to be compatible with common plumbing and may be provided with screw threads 8 for sealingly connecting thereto in an irrigation pump line before a check valve which is to be protected from solid particles large enough to interfere with valve operation. Axially positioned within the housing is inner cylinder 9 that may be solid (not shown) or hollow with closed end 10. Cylinder 9 may be provided with radially extending bars 18 to ensure a free fluid flow path at the outlet port 4. The inner cylinder 9 in combination with housing 1 defines an annular flow chamber 11 between inlet and outlet ports.

A hollow fluid impermeable partition cylinder 12, open at both ends, divides the annular flow chamber into two parallel concentric annular flow paths, an inner path 13 and an outer path 14. The two flow paths are filled with elongate filter means 15 and 24 such as woven wire fabric with a coarse mesh. What has been found satisfactory is a fabric obtained from Melard Mfg. Corp., Passaic, N.J. 07055 woven of stainless steel wire approximately 0.008 inches in diameter with irregularly shaped open spaces approximately seven to the inch. The cross sectional area of the filter path is relatively small compared to conventional filter assemblies, but the filter path length is very great, being substantially the length of housing 1 which, in one example, is nine inches. The open mesh size is much greater than the particles to be filtered out, but the long tortuous fluid path provided ensures that large particles will either be broken up into very small particles or trapped at some point in the interstices of the wire during their random travel through the filter means. The coarse nature of the mesh prevents the trapped particles from clogging the path since alternate paths around the trapped particles are freely available. There may be a problem with inserting the cylinder 9 with its encircling filter sleeve 15 into cylinder 12. A coarse mesh filter screen cap 19 that covers the filter sleeve 15 may be provided to prevent the sleeve 15 from sliding down on cylinder 9 when the closely fitting combination is inserted into cylinder 12. A second cap 23 serves the same purpose in keeping outer filter sleeve 24 on cylinder 12.

FIG. 4 illustrates another means for achieving the same function. A thin wall rubbery funnel shaped device 22 is slipped over the filter sleeve before insertion. After insertion the device 22 is pulled out of the open end of either cylinder 12 or housing 1 and reused for the next insertion.

To ensure free flow of fluid between the ends of cylinder 12 and either inlet or outlet ports, the edges of cylinder 12 may be provided with cut out portions 25.

Figure 5:
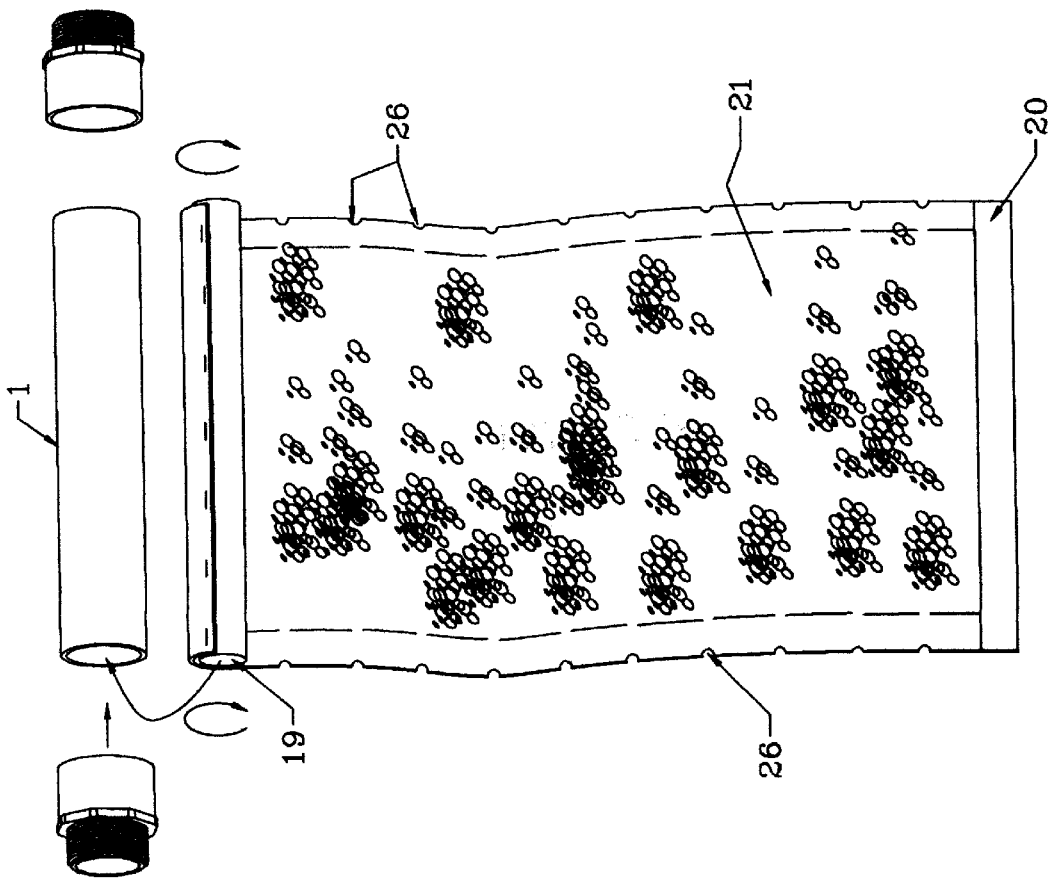
FIG. 5 is a perspective exploded view of another embodiment of the invention.

Referring now to FIGS. 5 and 6, another embodiment of the invention employs a web 20 of fluid impermeable material, such as a thin flexible sheet of PVC plastic that is spirally wound onto inner closed cylinder 19. The filter 21 is stapled to the web 20 and the web 20 is stapled to the inner cylinder 19 to facilitate assembly. The web is simply rolled up on the cylinder 19 and inserted into the housing. The web 20 may be provided with cut out portions 26 for free flow at inlet and outlet ports. The spirally wound web and filter divide the flow chamber into elongate narrow fluid paths through filter held between adjacent walls of web 20 or between a wall of web 20 and either housing 1 or cylinder 19.

The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. An elongate fluid filtering assembly comprising:
    a) an elongate hollow tubular housing having a long axis and two ends, an inlet open end port affixed to a first end, and an outlet open end port affixed to a second end, the end ports provided with means for sealingly connecting the housing in line with a fluid flow;
    b) an elongate, closed, fluid-impermeable inner cylinder disposed along the long axis of the housing and defining an annular flow chamber in cooperation with the housing;
    c) elongate, fluid-impermeable partition means encircling the inner cylinder for dividing the flow chamber into a plurality of parallel concentric annular flow paths having an axial first length;
    d) filter means disposed within each of said annular flow paths and encircling said axis for causing fluid passing between said end ports to pass axially therethrough and for preventing the passage therethrough of solids of a size large enough to interfere with a check valve in a water pump system; and
    e) said, filter means consisting of a coarse wire mesh having pore sizes larger than at least some of said solids and having a first dimension substantially equal to said first length, a second dimension at least great enough to encircle said inner cylinder and a third dimension far less than said first and second dimensions and great enough to extend between and abutting adjacent ones of said partition means, thereby providing an elongate tortuous flow path therethrough having a filter depth substantially equal to said first length and unencumbered by other filter elements to thereby resist clogging.

2. The assembly according to claim 1, in which the filter means comprises a coarse mesh, woven wire filter fabric.

3. The assembly according to claim 2, in which the partition means comprises at least one hollow cylinder.

4. The assembly according to claim 3, further comprising spacer means between the partition means and the outlet port for providing a free fluid passage therebetween.

5. The assembly according to claim 4, further comprising a fluid permeable cap means interposed between the partition means and the inlet port for providing a free fluid passage therebetween.

6. The assembly according to claim 2, in which the partition means comprises a spirally wound web.

7. The assembly according to claim 6, further comprising spacer means between the partition means and the outlet port for providing free fluid flow therebetween.

8. The assembly according to claim 1, in which the partition means comprises at least one hollow cylinder.

9. The assembly according to claim 8, further comprising spacer means interposed between the partition means and the outlet port for providing a free fluid passage therebetween.

10. The assembly according to claim 1, in which the partition means comprises a spirally wound web.

11. The assembly according to claim 10, further comprising spacer means between the partition means and the outlet port for providing free passage therebetween.

* * * * *